July 1, 1930.  E. F. LUNDEEN  1,769,228
ELECTROLYTIC RECTIFIER
Filed April 14, 1927
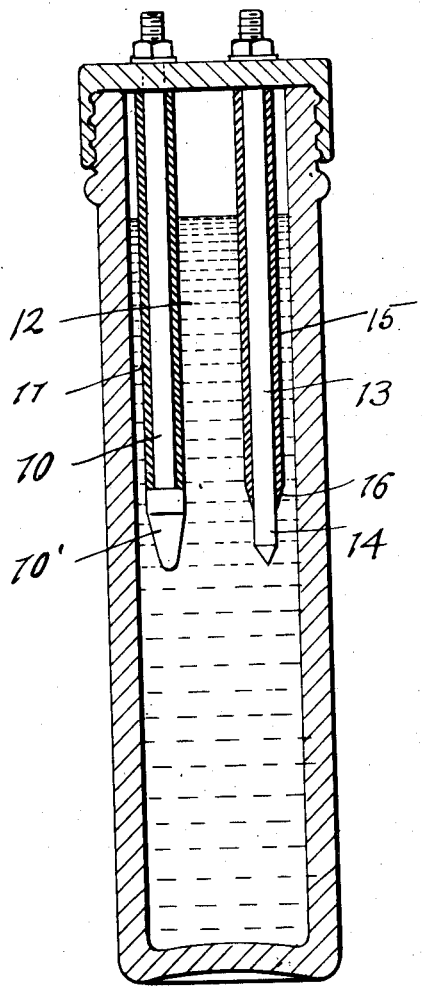

Patented July 1, 1930

1,769,228

UNITED STATES PATENT OFFICE

ERNEST F. LUNDEEN, OF CLEVELAND HEIGHTS, OHIO, ASSIGNOR TO WILLARD STORAGE BATTERY COMPANY, OF CLEVELAND, OHIO, A CORPORATION OF WEST VIRGINIA

ELECTROLYTIC RECTIFIER

Application filed April 14, 1927. Serial No. 183,821.

This invention relates to improvements in electrolytic cells, particularly those employed for alternating current rectifiers.

One of the objects of the invention is to increase the voltage which may be impressed upon the terminals of a rectifier of a given number of cells, in other words, to increase the breakdown voltage per cell. By breakdown voltage is meant the voltage which the cell will stand without permitting the passage of current within the cell from the film-forming electrode to the non-film-forming electrode, that is, the passage of a current opposite in direction to that which the cell is designed to transmit.

Another object of the invention is the provision of an electrolyte which will permit increasing the effective area of the electrodes, and will thus reduce the current density and increase the life of the aluminum electrode.

Still another object is to reduce the amount of metallic deposit which forms upon the aluminum electrode and to change the character of that which does form so that the rectification of the current begins more quickly and proceeds more effectively.

After much investigation and experimentation, I have made the discovery that small amounts of certain chromates, when added to electrolytes of a certain character, will greatly increase the breakdown voltage and will also enable the film-forming electrode to function with a much reduced current density and will decrease the amount of black metal deposited on the aluminum electrode. While it is impracticable to list all of the solutions with which it may be possible to combine chromates for the purpose of obtaining the improvements derived by my invention, I can state that electrolytes employing organic acids are in general thus improved to a greater or lesser extent and that this is particularly true of electrolytes employing citric acid and, to a somewhat lessened extent, of those employing malic acid. Along with the organic acid I employ a suitable salt or salts which will combine under electrolytic action with the film forming electrode. As an example of such ingredient I desire to mention ammonium phosphate or potassium phosphate or a mixture of the two. Various chromates or dichromates may be used, but my investigations thus far indicate that potassium chromate ($K_2CrO_4$) or potassium dichromate ($K_2Cr_2O_7$) are the most efficient. When the chromate is used, it is converted by the acid solution into the dichromate.

In the drawing, I have illustrated in a more or less diagrammatic manner a vertical cross section of an electrolytic cell in which the aluminum or film-forming electrode is illustrated at 10, with a small portion 10′ at the lower extremity thereof exposed, the balance of the electrode being covered and protected by a sleeve 11 of hard rubber or other material which is impervious to the electrical as well as the chemical action of the electrolyte 12. The other electrode, which I prefer to form of lead, iron or steel, is indicated at 13, and in this case also I expose only the lower extremity 14 to the action of the electrolyte, the remainder of the electrode being covered by a sleeve 15 similar to the sleeve 11, but tapered at 16.

As explained above, I am aware of the fact that a considerable range of equivalents falls within the scope of my invention, but for the purpose of pointing out the best embodiment of the invention now known to me, it may be stated that the ingredients which I prefer to employ in making up, for example, a solution of 900 cc. is as follows:

| | Grams |
|---|---|
| Citric acid | 85 |
| Ammonium phosphate | 100 |
| Potassium phosphate | 20 |
| Sodium benzoate | 3 |
| Potassium dichromate | 2 |

Any small quantity of chromate will have some beneficial effect, which effect increases up to two grams substantially. A proportion of chromate somewhat in excess of that amount, although of no added value, is not objectionable, but if the amount of chromate is unduly increased, it has a deleterious effect on the aluminum electrode.

In addition to the increase in breakdown voltage gained by the use of chromate in accordance with my invention, two other advantages are to be noted, first, that it is unnecessary to use a current of such high density in order to maintain a strong film, and, second, that the metallic deposit formed upon the aluminum electrode is decreased. The first added effect mentioned enables me to increase the exposed area of the electrodes by about 100%, which is of importance in that the life of the aluminum electrode is thereby greatly prolonged. With regard to the second added effect, the presence of chromate in the solution causes some of the metallic material coming from the iron or lead electrode to be precipitated instead of deposited upon the aluminum electrode, and that which is deposited upon the aluminum electrode appears to be of a porous nature and to adhere loosely to the aluminum electrode with the consequent effect of interfering to a lesser extent with the passage of current and enabling rectification to begin more quickly after the current is turned on. While in the foregoing description I have set forth the invention somewhat in detail, such detail disclosure is primarily for the purpose of fully explaining the invention and is not in itself to be construed as amounting to a limitation upon the scope thereof.

I claim as my invention:

1. An electrolyte for an electrolytic cell, comprising an organic acid, a phosphate, and a small proportion of a chromate.

2. An electrolyte for an electrolytic cell, comprising an organic acid, a phosphate, and a small proportion of a chromate of potassium.

3. An electrolyte for an electrolytic cell, comprising an organic acid, a phosphate, and a small proportion of potassium dichromate.

4. An electrolyte for an electrolytic cell, comprising citric acid, a phosphate, and a small proportion of a chromate.

5. An electrolyte for an electrolytic cell, comprising an organic acid, ammonium phosphate, and a small proportion of a chromate.

6. An electrolyte for an electrolytic cell, comprising an organic acid, ammonium phosphate, and a small proportion of a chromate of potassium.

7. An electrolyte for an electrolytic cell, comprising an organic acid, ammonium phosphate, and a small proportion of potassium dichromate.

8. An electrolyte for an electrolytic cell, comprising citric acid, ammonium phosphate, and a small proportion of a chromate.

9. An electrolyte for an electrolytic cell, comprising citric acid, ammonium phosphate, and a small proportion of a chromate of potassium.

10. An electrolyte for an electrolytic cell, comprising citric acid, ammonium phosphate, and a small proportion of potassium dichromate.

11. In an electrolyte for an electrolytic cell, the combination of a solution containing an organic acid and phosphates of a combined amount approximating 100 parts by weight, with a chromate approximating one part by weight.

12. In an electrolyte for an electrolytic cell, the combination of a solution containing organic acid and phosphates of a combined amount approximating 100 parts by weight, with a chromate of potassium approximating one part by weight.

13. In an electrolyte for an electrolytic cell, the combination of a solution containing citric acid and phosphates of a combined amount approximating 100 parts by weight, with a chromate of approximately one part by weight.

14. In an electrolyte for an electrolytic cell, the combination with a solution containing citric acid and phosphates of a combined amount approximating 100 parts by weight, of a small amount of chromate not exceeding four parts by weight.

15. In an electrolyte for an electrolytic cell, a solution comprising the following ingredients in substantially the proportions by weight stated:

| | Grams |
|---|---|
| Citric acid | 85 |
| Ammonium phosphate | 100 |
| Potassium phosphate | 20 |
| Chromate of potassium | 2 |

16. An electrolyte for an electrolytic cell containing an organic acid, a salt which will combine under electrolytic action with a film-forming electrode, and a relatively small amount of a chromate.

17. An electrolyte for an electrolytic cell containing an organic acid, a salt which will combine under electrolytic action with a film-forming electrode, and a relatively small amount of a chromate of potassium.

18. An electrolyte for an electrolytic cell containing a citrate and a salt which will combine under electrolytic action with a film-forming electrode, and a chromate.

19. An electrolyte for an electrolytic cell containing an organic acid and a salt which will combine under electrolytic action with a film-forming electrode, and a chromate.

20. An electrolyte for an electrolytic cell, comprising an organic acid, a phosphate, and a chromate.

In testimony whereof, I hereunto affix my signature.

ERNEST F. LUNDEEN.